(12) United States Patent
Vallapureddy et al.

(10) Patent No.: US 11,716,381 B2
(45) Date of Patent: Aug. 1, 2023

(54) EXPORTING DATA TO A CLOUD-BASED SERVICE

(71) Applicant: Capital One Services, LLC, McLean, VA (US)

(72) Inventors: Anil Kumar Vallapureddy, Glenn Allen, VA (US); Michael Baker, Richmond, VA (US); Brian Lin, Richmond, NJ (US); Caroline Paul, Annandale, NJ (US); Tyler Yandrofski, Chapel Hill, NC (US); Anikeit Chanda, East Amherst, NY (US); Alexander McQuilkin, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/301,732

(22) Filed: Apr. 13, 2021

(65) Prior Publication Data

US 2022/0329655 A1    Oct. 13, 2022

(51) Int. Cl.
*H04L 67/10*     (2022.01)
*H04L 67/1095*   (2022.01)
*G06F 16/955*    (2019.01)
*H04L 9/40*      (2022.01)

(52) U.S. Cl.
CPC ........ *H04L 67/1095* (2013.01); *G06F 16/955* (2019.01); *H04L 63/0272* (2013.01); *H04L 63/0807* (2013.01)

(58) Field of Classification Search
CPC . H04L 67/1095; H04L 67/10; H04L 63/0272; H04L 63/0807; G06F 16/955; G06F 16/972; G06F 16/986; G06F 16/258; G06F 16/93
See application file for complete search history.

(56) References Cited

U.S. PATENT DOCUMENTS

| | | | |
|---|---|---|---|
| 10,536,513 B2 | 1/2020 | Newman et al. | |
| 10,732,810 B1* | 8/2020 | Cohen | G06T 11/206 |
| 10,922,748 B1* | 2/2021 | Rockefeller | G06Q 30/0601 |
| 10,965,665 B1 | 3/2021 | Privette et al. | |
| 11,087,080 B1* | 8/2021 | Yousaf | G06F 3/0486 |
| 2016/0191432 A1* | 6/2016 | Panchapakesan | G06F 16/972 |
| | | | 709/206 |
| 2018/0004722 A1* | 1/2018 | Naor | G06F 16/93 |
| 2018/0091579 A1 | 3/2018 | Thomas | |

(Continued)

OTHER PUBLICATIONS

International Search Report and Written Opinion for Application No. PCT/US2022/071300, dated Jun. 24, 2022, 10 pages.

(Continued)

*Primary Examiner* — Jungwon Chang
(74) *Attorney, Agent, or Firm* — Harrity & Harrity, LLP

(57) ABSTRACT

In some implementations, a device, using a browser extension of a browser application, may obtain the data from an application using a private endpoint of the application. The private endpoint of the application may be accessible via a private network in which the browser application is implemented and may not be accessible via a public network. The device, using the browser extension of the browser application, may transmit, to the cloud-based service, the data to cause the cloud-based service to populate a document with the data.

20 Claims, 9 Drawing Sheets

(56) References Cited

U.S. PATENT DOCUMENTS

| | | | |
|---|---|---|---|
| 2018/0143961 A1* | 5/2018 | Thomas | H04L 67/10 |
| 2018/0157468 A1* | 6/2018 | Stachura | G06F 8/34 |
| 2018/0157726 A1* | 6/2018 | Shah | G06F 16/258 |
| 2018/0253319 A1* | 9/2018 | Evans | G06F 16/986 |
| 2019/0187962 A1 | 6/2019 | Stachura | |
| 2020/0133642 A1* | 4/2020 | Payne | G06F 8/38 |
| 2020/0151630 A1* | 5/2020 | Shakhnovich | G06Q 10/0633 |

OTHER PUBLICATIONS

OLLIEINC., "Google Sheets (Wikipedia)," Apr. 6, 2021, pp. 1-6, XP055931239, Retrieved from the Internet: [https://en.wikipedia.org/w/index.php] [retrieved on Jun. 14, 2022].

* cited by examiner

400

410 — Receive, using a browser extension of a browser application, a request from a user to export data from an application to a document, of a cloud-based service, that is displayed by the browser application

420 — Obtain, based on the request and using the browser extension, the data from the application using a private endpoint of the application, where the private endpoint of the application is accessible via a private network in which the browser application is implemented and is not accessible via a public network

430 — Obtain, from the browser application and using the browser extension, a resource identifier of the document that is displayed by the browser application, where the resource identifier of the document includes an identifier of the document

440 — Extract the identifier of the document from the resource identifier of the document

450 — Transmit, using the browser extension and to the cloud-based service, the data and the identifier to cause the cloud-based service to populate the document with the data

EXPORTING DATA TO A CLOUD-BASED SERVICE

BACKGROUND

A browser extension is an application that enhances functionality of a web browser. In some cases, a browser extension may execute a script (e.g., code, which may be written in a scripting language, such as JavaScript, or the like) to perform an operation in association with the web browser, a web page accessed by and/or rendered by the web browser, or the like. Some scripts may be executed based on user input (e.g., clicking a button or otherwise interacting with a user input component), and some scripts may be automatically executed (e.g., based on a determination that one or more conditions are satisfied).

SUMMARY

In some implementations, a non-transitory computer-readable medium storing a set of instructions for exporting data to a cloud-based service includes one or more instructions that, when executed by one or more processors of a device, cause the device to: receive, using a browser extension of a browser application, a request from a user to export the data from an application to a document, of the cloud-based service, that is displayed by the browser application; obtain, based on the request and using the browser extension, the data from the application using a private endpoint of the application, wherein the private endpoint of the application is accessible via a private network in which the browser application is implemented and is not accessible via a public network; obtain, from the browser application and using the browser extension, a resource identifier of the document that is displayed by the browser application, wherein the resource identifier of the document includes an identifier of the document; extract the identifier of the document from the resource identifier of the document; and transmit, using the browser extension and to the cloud-based service, the data and the identifier to cause the cloud-based service to populate the document with the data.

In some implementations, a system for exporting data to a cloud-based service includes one or more memories and one or more processors, communicatively coupled to the one or more memories, configured to: obtain, using a browser extension of a browser application, the data from an application using a private endpoint of the application; determine, using the browser extension, an identifier of a document, of the cloud-based service, to which the data is to be exported; and transmit, using the browser extension and to the cloud-based service, the data and the identifier to cause the cloud-based service to populate the document with the data.

In some implementations, a method of exporting data to a cloud-based service includes obtaining, by a device using a browser extension of a browser application, the data from an application using a private endpoint of the application, wherein the private endpoint of the application is accessible via a private network in which the browser application is implemented and is not accessible via a public network; and transmitting, by the device using the browser extension and to the cloud-based service, the data to cause the cloud-based service to populate a document with the data.

BRIEF DESCRIPTION OF THE DRAWINGS

FIG. 4 is a flowchart of an example process relating to exporting data to a cloud-based service.

DETAILED DESCRIPTION

Figure 1A:
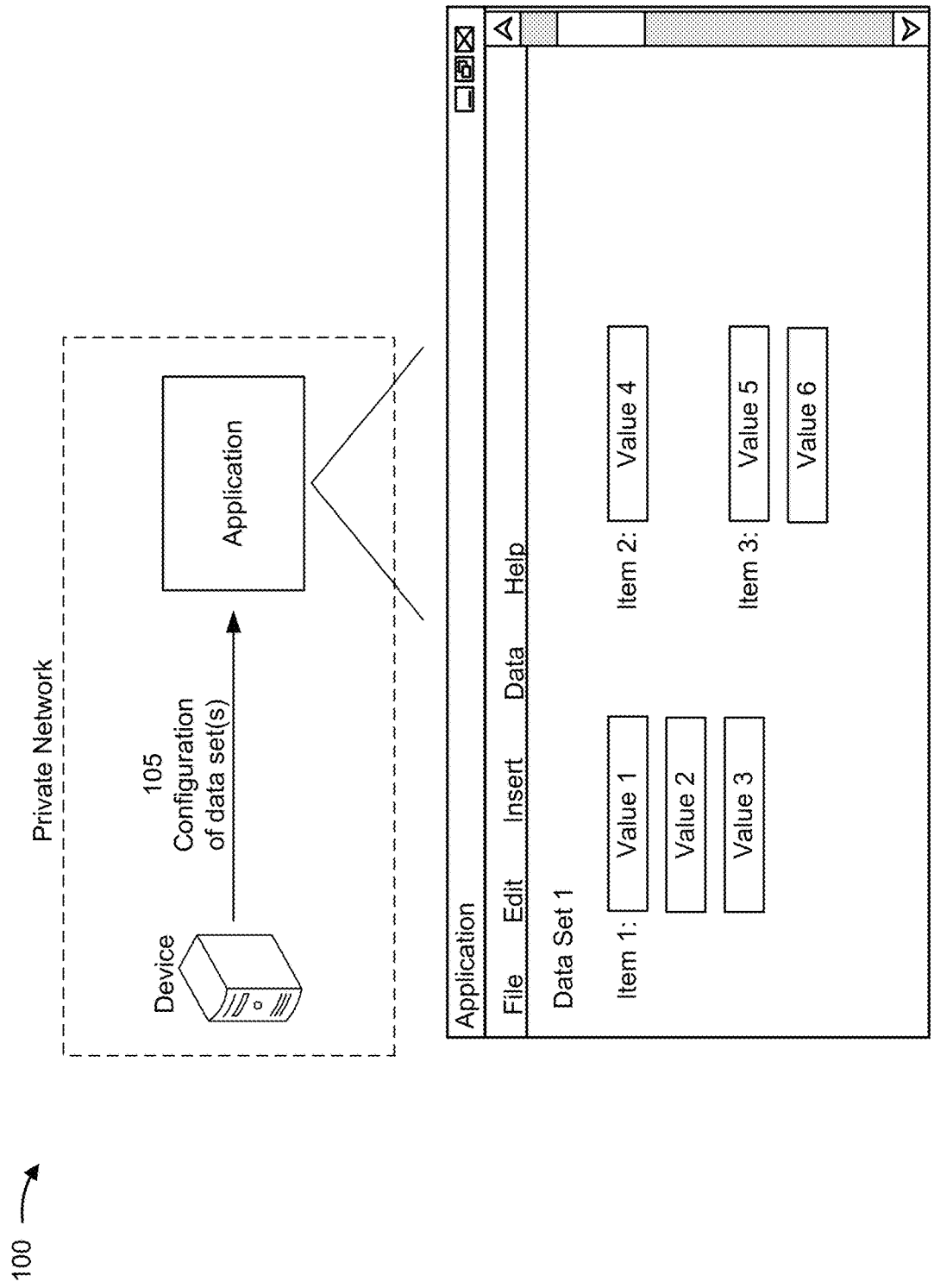
FIGS. 1A-1F are diagrams of an example implementation relating to exporting data to a cloud-based service.

The following detailed description of example implementations refers to the accompanying drawings. The same reference numbers in different drawings may identify the same or similar elements.

A user may utilize various software applications for performing a task. In some cases, it may be useful for the user to export data from one application (which may be referred to as an "exporting application") to another application (which may be referred to as an "importing application"). For example, it may be useful to export financial data associated with a financial application to a spreadsheet application in order to better organize and evaluate the financial data. Typically, an exporting application and an importing application may be associated with an organization's private network. Accordingly, sensitive data can be communicated between the exporting application and the importing application with little security risk. For example, one or both of the exporting application and the importing application may include an add-in (also referred to as an add-on) application that facilitates communication between the applications over the organization's private network.

However, in some cases, the exporting application may be associated with the organization's private network, and the importing application may be cloud based (e.g., not associated with the organization's private network). For example, the importing application may be associated with a cloud-based service that centrally hosts the importing application. As an example, the exporting application may be the financial application described above, and the importing application may be a cloud-based spreadsheet application. In such cases, it is risky to communicate sensitive data between the exporting application and the importing application. For example, the importing application may include an add-in application that facilitates communication between the applications over a public network (e.g., the internet). In order to enable such communication, the exporting application may need to expose an application programming interface (API) endpoint on the public internet.

As a result, sensitive data of the exporting application may be exposed to hacking and related malicious uses. Accordingly, systems of the organization may consume significant computing and network resources monitoring for unauthorized attempts to access the data and/or responding to unauthorized attempts to access the data. Moreover, systems of the organization may consume significant computing and network resources when mitigating unauthorized uses of hacked data.

In some implementations, to solve the problems described above, as well as a technical problem of how to export data from an application to a cloud-based service without exposing an endpoint of the application to the public internet, a technical solution is described herein for securely exporting data from an application to a cloud-based service. In some implementations, a browser extension of a browser application may be used to communicate data between the application and the cloud-based service. The browser extension may communicate with the application using an API, and the browser extension may communicate with the cloud-based service using a different API. Moreover, the browser extension may use a private endpoint (e.g., API endpoint) of the application when communicating with the application. The private endpoint may be accessible via a private network, in which the browser application is implemented, and may not be accessible via a public network.

In this way, the browser extension, using the private endpoint, may obtain data from the application in a secure manner and may transmit the data to the cloud-based service for populating a document of a cloud-based application. The browser extension executes locally, and therefore permits access to the private endpoint from the private network. Accordingly, an endpoint of the application does not need to be exposed on the public internet, thereby reducing or preventing hacking or other malicious uses of the data. Thus, computing and network resources that would otherwise be consumed monitoring for unauthorized attempts to access the data, responding to unauthorized attempts to access the data, and/or mitigating unauthorized uses of hacked data are conserved.

FIGS. 1A-1F are diagrams of an example implementation 100 associated with exporting data to a cloud-based service. As shown in FIGS. 1A-1F, example implementation 100 includes a device, which may implement (e.g., using one or more memories and/or one or more processors) a browser application (e.g., a web browser application) that includes a browser extension. Example 100 also includes an application, which may be implemented by the device and/or by one or more other devices (e.g., one or more application servers). In some implementations, an endpoint of the application is only accessible via a private network (e.g., an internal network of an organization) in which the browser application is implemented. Example 100 additionally includes a cloud-based service, which may be implemented by one or more other devices (e.g., one or more web servers). These devices are described in more detail below in connection with FIG. 2 and FIG. 3.

As shown in FIG. 1A, and by reference number 105, the device may provide, to the application, information that configures one or more data sets. For example, the information may include data for a data set. As another example, the information may identify a structure of a data set and/or identify data for a data set (e.g., according to a type of the data, a category of the data, or a date range associated with the data), among other examples. For example, the information may include a query (e.g., a database query) that is structured to return a data set when the query is executed. A data set may include data (e.g., one or more items of data) that is manually entered by a user of the application (e.g., using the device) and/or data that is generated by the application. In some implementations, another device may additionally, or alternatively, provide information that configures one or more data sets.

In some implementations, the application is a cloud-based application (e.g., implemented by a cloud-based application server). That is, the application may be implemented in a cloud computing environment. In some implementations, the application is implemented on the device or another device that is part of the private network (e.g., the application is a local application). In some implementations, the application is a financial application associated with financial data (e.g., budget data, actuals data, or forecast data, among other examples). Thus, in some examples, one or more of the data sets described above may include financial data.

Figure 1B:
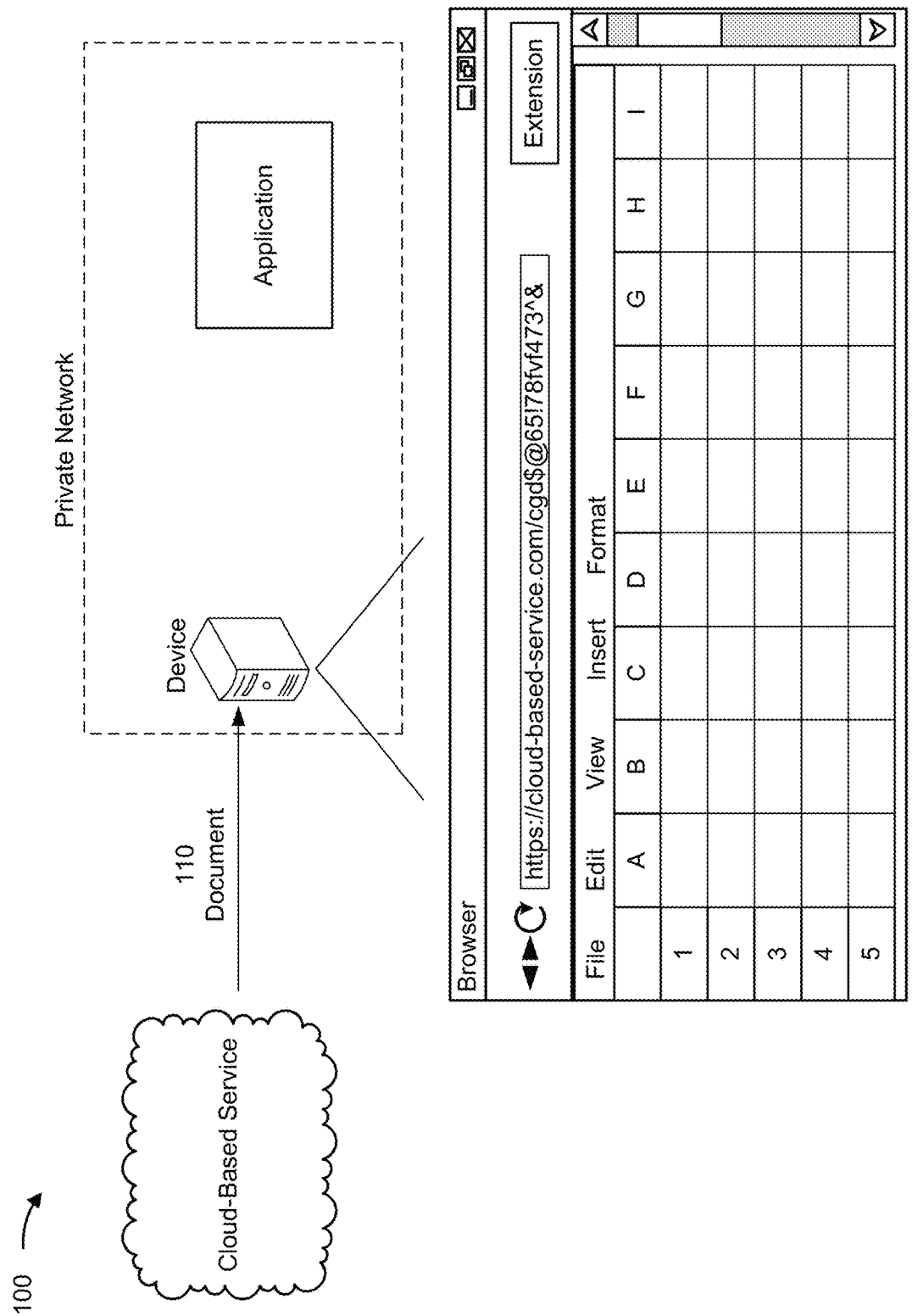

As shown in FIG. 1B, and by reference number 110, the device may access (e.g., obtain) a document of the cloud-based service. For example, the device may access the document using the browser application (e.g., via a public network, such as the internet). In other words, the browser application of the device may display the document. The device may access the document, using the browser application, using a resource identifier (e.g., a uniform resource locator (URL)) for the document. In some implementations, the document accessed by the device may be a blank document (e.g., a document that does not contain user-specific content).

The cloud-based service may provide cloud computing services. For example, the cloud-based service may be a provider of software as a service (SaaS), hosted applications, or the like. The document may be associated with a cloud-based application provided by the cloud-based service. For example, the cloud-based application may be a spreadsheet application, a presentation application, and/or a word-processing application, among other examples. Thus, the document may be a spreadsheet document, a presentation document (e.g., one or more presentation slides), and/or a word-processing document, among other examples.

Figure 1C:
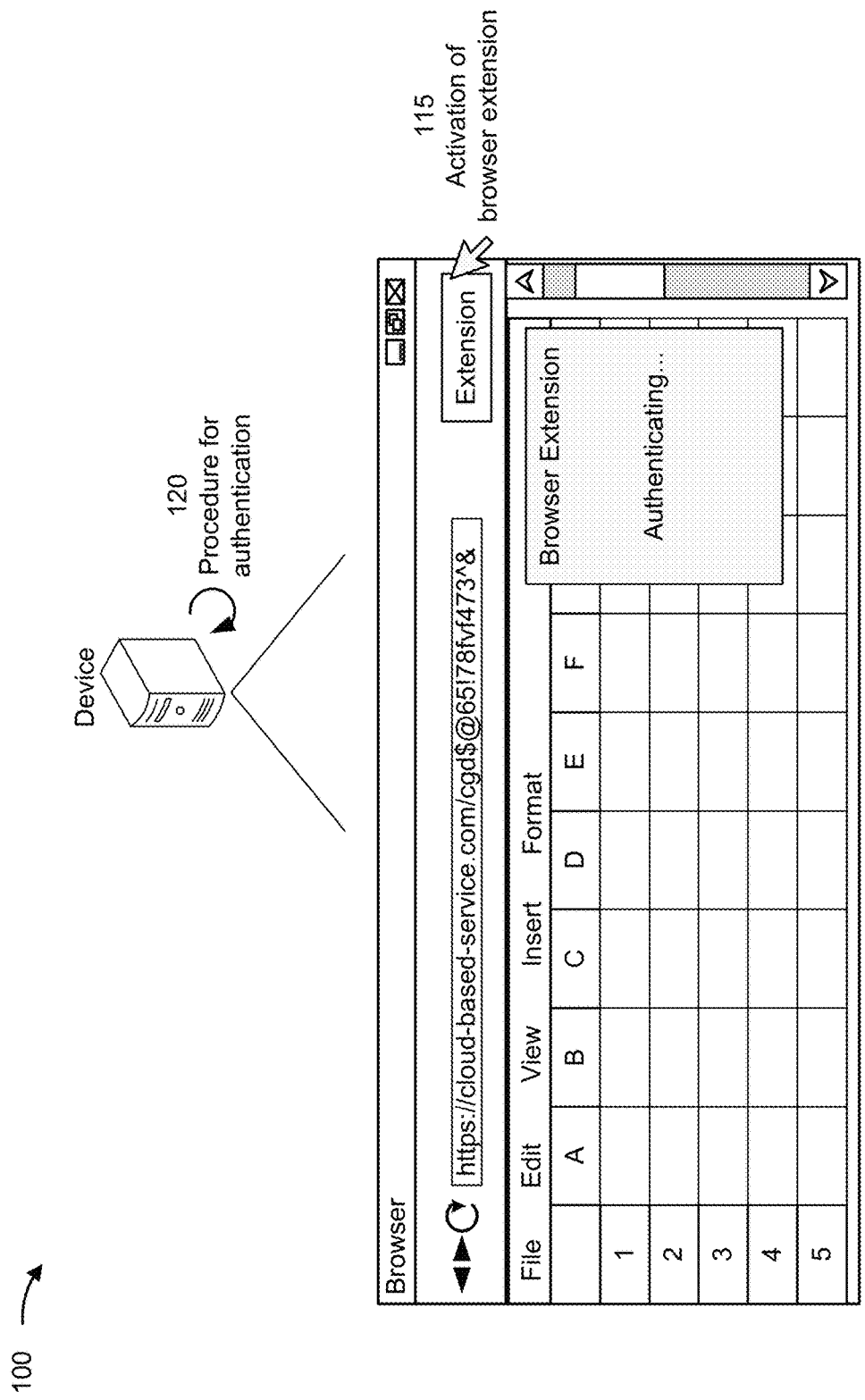

As shown in FIG. 1C, and by reference number 115, the device may activate (e.g., invoke) the browser extension of the browser application. In some implementations, the device may activate the browser extension based on a user input (e.g., a user clicking on an icon for the browser extension). In some implementations, the device may activate the browser extension automatically (e.g., based on a triggering event). For example, the device may activate the browser extension based on detecting that the browser application is displaying the document of the cloud-based service. The browser extension may include a software module (e.g., source code) that provides a custom behavior of the browser application.

As shown by reference number 120, the device, using the browser extension, may perform a procedure for authentication. The procedure for authentication may be used to authenticate a user of the browser application. In some implementations, the procedure for authentication may be used to authenticate the user for access to the private network. Additionally, or alternatively, the procedure for authentication may be used to authenticate the user for access to the application. For example, the procedure for authentication may be used to authenticate the user for requesting data exportation from the application.

In some implementations, according to the procedure for authentication, the device may receive a credential associated with the user (e.g., a username and/or a password) via the browser extension. The device may provide the credential (or information identifying the credential) to the application for authentication of the user.

In some implementations, according to the procedure for authentication, the device, using the browser extension, may obtain an authentication token (e.g., a single sign-on (SSO) authentication token) associated with the user. The authentication token may be for the application. The device may provide the authentication token to the application for authenticating the user. In some examples, the device, using the browser extension, may invoke a function (e.g., a callback function, which may be implemented in a cloud computing resource) that returns the authentication token to the browser extension. For example, the browser extension may provide an authentication request (e.g., that identifies the user) to the function and the function may process the authentication request. In some implementations, the function, when processing the authentication request, may provide authentication information, associated with the authentication request, to an authentication service (e.g., an SSO service), and the authentication service may provide the authentication token to the function upon authenticating the user. The device, using the browser extension, may receive the authentication token from the function and provide the authentication token to the application (e.g., in connection with one or more requests to the application, as described below).

Figure 1D:
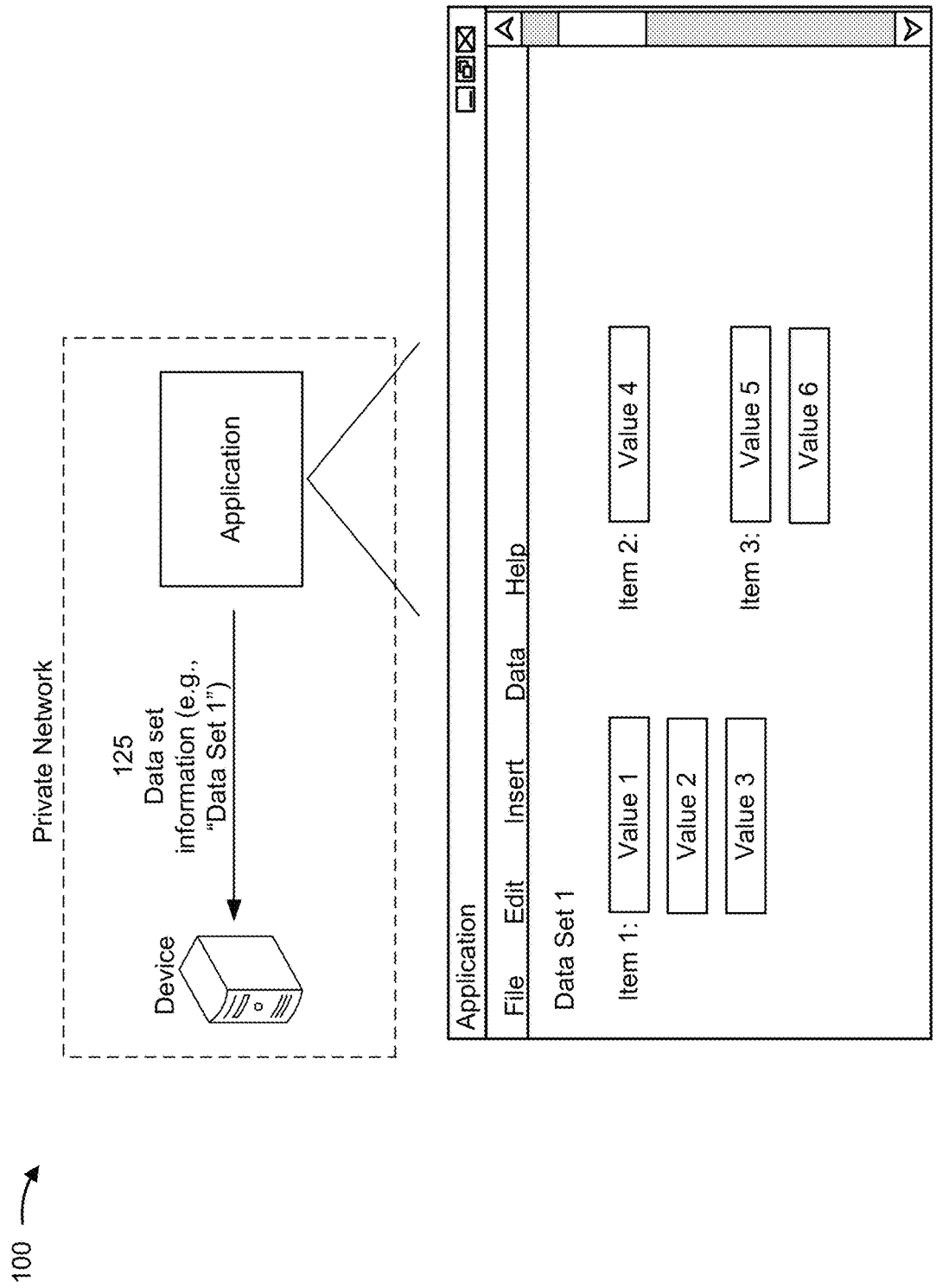

As shown in FIG. 1D, and by reference number 125, the device, using the browser extension, may obtain information identifying one or more data sets of the application (e.g., the information may identify one or more queries used by the application). For example, the device, using the browser extension, may transmit a request (e.g., an API request) to the application for the information identifying the one or more data sets. The device may transmit the request using a private endpoint (e.g., API endpoint) of the application, as described below. The request may include the authentication token obtained by the browser extension. Thus, the one or more data sets may include data sets that the user is authorized to access (e.g., one or more data sets that are unique to the user). The device, using the browser extension, may receive (e.g., via the API of the application) a response to the request that includes the information identifying the one or more data sets. The information identifying the one or more data sets may include names or other identifiers of the one or more data sets.

The browser extension may display a user interface in which the information identifying the one or more data sets is presented to the user. For example, the user interface may include a selection input that can be used by the user to select a data set for exporting.

Figure 1E:
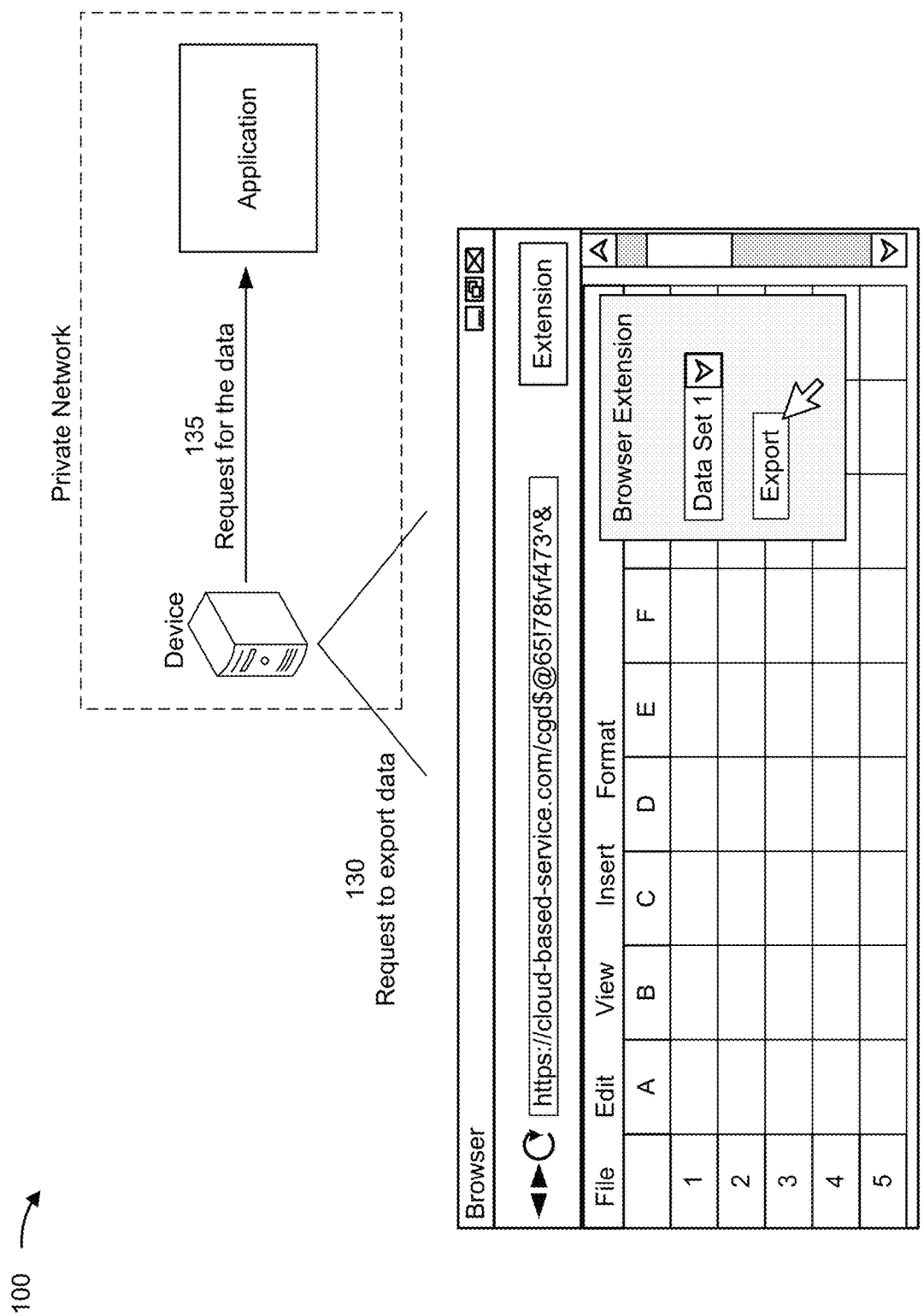

As shown in FIG. 1E, and by reference number 130, the device, using the browser extension, may receive a request to export data from the user. For example, the user may select a data set from the one or more data sets presented to the user in the browser extension, and the user may submit a request for the selected data set via the browser extension. The request may indicate that the data, associated with the data set, is to be exported from the application to the document of the cloud-based service (e.g., the document that is displayed by the browser application).

In some implementations, the device, using the browser extension, may automatically (e.g., without the request) select the data set that is to be exported. In some implementations, the device may select the data set based on a name associated with the document or another identifier associated with the document. As an example, the device, using the browser extension, may obtain the name of the document (e.g., by parsing a document object model (DOM) associated with the document) and determine a data set associated with a name that corresponds to the name of the document (e.g., a data set that is associated with the same name as the name associated with the document). In some implementations, the device may select the data based on the data being the only data associated with the user, the data being the most-recently accessed data by the user, the data being default data for the user, or the like.

As shown by reference number 135, the device, using the browser extension, may transmit a request (e.g., an API request) for the selected data (e.g., based on the user request). The device may transmit the request using a private endpoint (e.g., API endpoint) of the application, as described below. The request may include the authentication token obtained by the browser extension. In some implementations, the request may identify a query that is to be executed by the application in order to identify (e.g., return) the data.

Figure 1F:
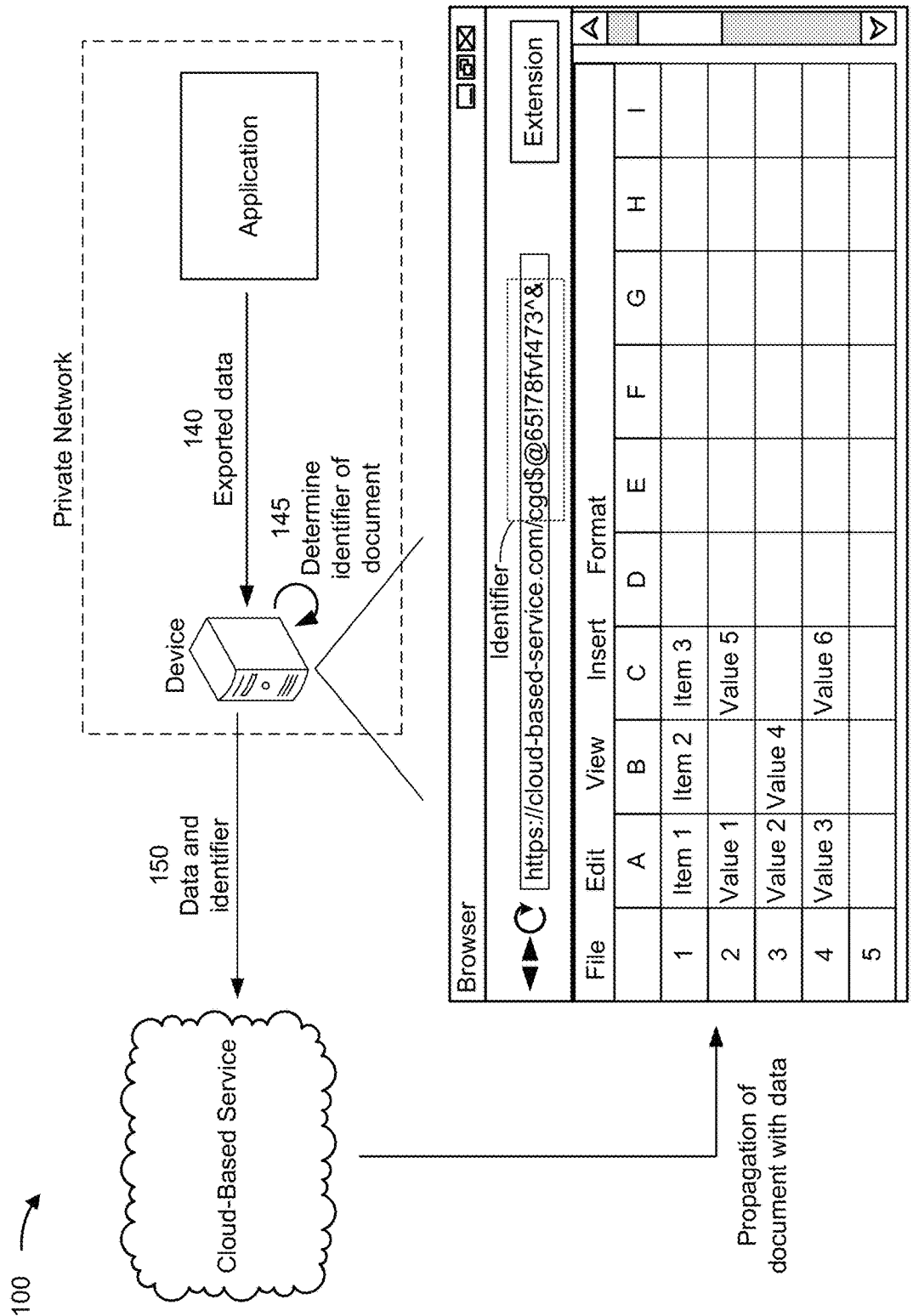

As shown in FIG. 1F, and by reference number 140, the device (e.g., based on the user request), using the browser extension, may obtain the data from the application. That is, the device, using the browser extension, may receive a response to the request from the application that includes the data (and the application may obtain the requested data, such as by executing a query indicated by the request). The device, using the browser application, may obtain the data from the application using an API (e.g., a representational state transfer (REST) API) of the application. Moreover, the device, using the browser extension, may obtain the data from the application using a private endpoint of the application. The private endpoint of the application may be an API endpoint of the application.

In some implementations, the private endpoint of the application is accessible via the private network in which the browser application is implemented and is not accessible via a public network (e.g., the internet). For example, the device may implement the browser application, and the device may be included in the private network. As another example, the device may implement a virtual machine that includes the browser application, and the virtual machine may be included in the private network. The private network (e.g., an internal network of an organization) may include a network that can be accessed only by authenticated devices and/or users (e.g., using a password, a token, a digital certificate, or the like). In some implementations, the private network is a local area network (LAN), a virtual private network (VPN), or a virtual private cloud (VPC) network.

In some implementations, the device, using the browser extension, may communicate with the application, the function, and/or the cloud-based service via a proxy server. In some implementations, the application is implemented in a first cloud computing environment (which may be the same environment in which the function and the SSO service are implemented), and the cloud-based service is implemented in a second cloud computing environment (e.g., the first environment and the second environment do not share computing resources, do not share user authentication, do not share APIs, or the like).

As shown by reference number 145, the device, using the browser extension, may determine an identifier of the document displayed by the browser application. For example, the device, using the browser extension, may obtain from the browser application a resource identifier (e.g., a URL) of the document displayed by the browser application. The resource identifier may include an identifier of the document. Accordingly, the device, using the browser extension, may extract (e.g., parse) the identifier of the document from the resource identifier of the document. In some implementations, the device may obtain the identifier of the document without obtaining the resource identifier and extracting the identifier. For example, the device may obtain the identifier from a data structure (e.g., a database) that identifies an association between the identifier and the data (e.g., based on a previous use of the identifier in connection with a query associated with the data).

As shown by reference number 150, the device, using the browser extension, may transmit the data and the identifier to the cloud-based service. For example, the device, using the browser extension, may transmit a request to the cloud-based service that includes the data and the identifier. The request may indicate that the data is to be used to populate the document associated with the identifier. In some implementations, the device, using the browser extension, may format the data (e.g., using a JavaScript library) for the request. In some implementations, the request may indicate an arrangement (e.g., a structure) by which the data is to be populated in the document (e.g., the data may be transmitted with information that identifies the arrangement). For example, the arrangement may identify one or more cells of a spreadsheet document that are to include the data, one or more slides of a presentation document that are to include the data, formatting of the data (e.g., for a spreadsheet document, a presentation document, or a word processing document), or the like.

The request may be an API request. That is, the device, using the browser extension, may transmit the data and the identifier to the cloud-based service using an API of the cloud-based service (e.g., a different API than the API used by the device to communicate with the application). The request may cause the cloud-based service to populate the document with the data. For example, the cloud-based service may populate the document, identified by the identifier of the request, with the data identified by the request in accordance with the arrangement identified by the request. In this way, the browser extension facilitates secure communication of data from the application to the cloud-based service.

In some implementations, the device may use the browser extension to update the data of a previously populated document in a similar manner as described above. For example, the device may activate the browser extension while the browser application is displaying a previously populated document in order to update the document in a similar manner as described above. In some implementations, the device, using the browser extension, may select a data set that is to be used for updating the document (e.g., without a user selection) based on a stored association between the data set and the document (e.g., a query associated with the data set was previously used to obtain information for populating the document) and/or based on a name associated with the document (e.g., the data set is associated with the same name as the name associated with the document).

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
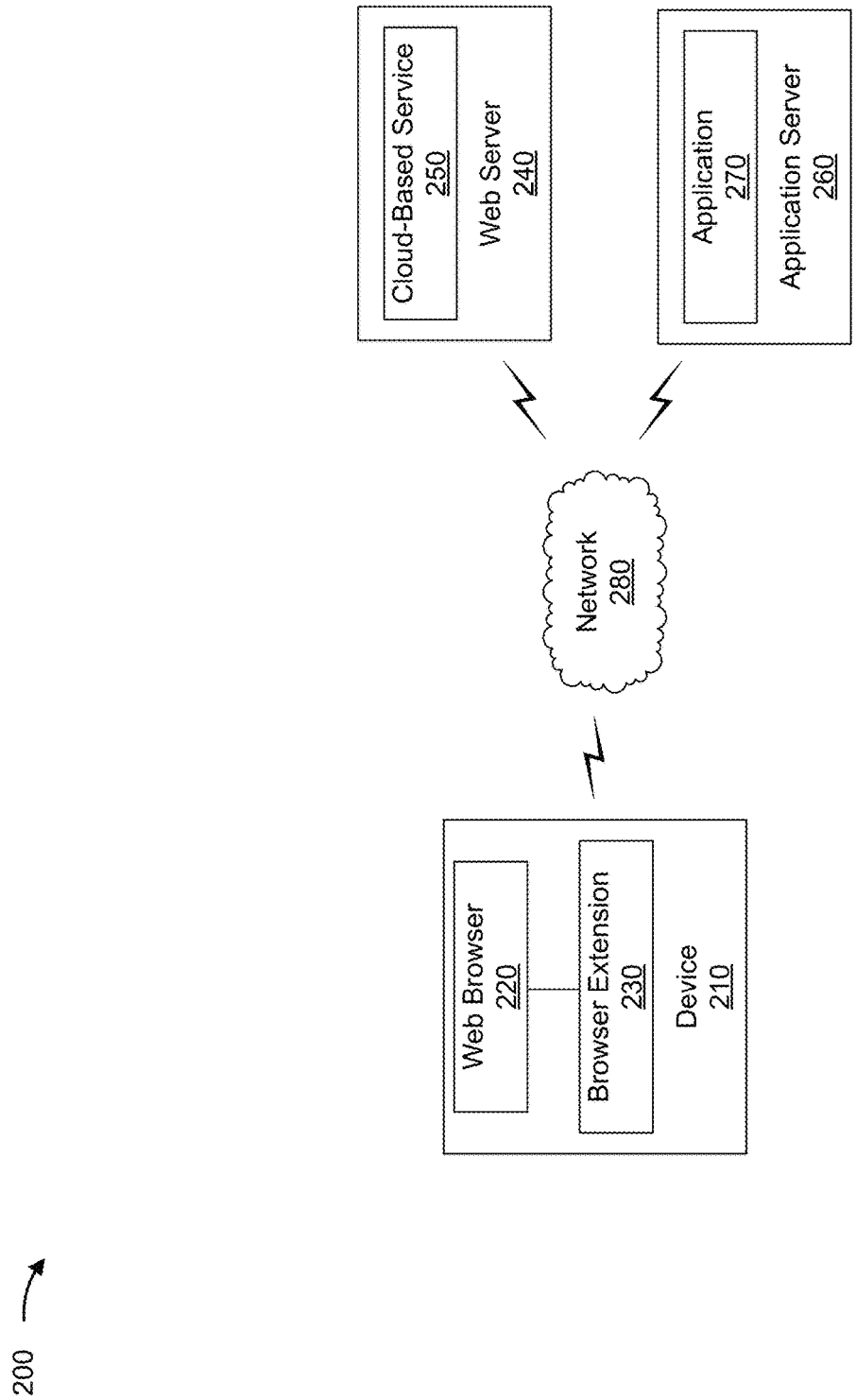
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210 (e.g., which may implement a web browser 220 and a browser extension 230), a web server 240 (e.g., which may implement a cloud-based service 250), an application server 260 (e.g., which may implement an application 270), and a network 280. Devices of environment 200 may interconnect via wired connections, wireless connections, or a combination of wired and wireless connections.

Client device 210 includes a device that supports web browsing. For example, client device 210 may include a computer (e.g., a desktop computer, a laptop computer, a tablet computer, and/or a handheld computer), a mobile phone (e.g., a smart phone), a television (e.g., a smart television), an interactive display screen, and/or a similar type of device. Client device 210 may host a web browser 220 and/or a browser extension 230 installed on and/or executing on the client device 210.

Web browser 220 includes an application, executing on client device 210, that supports web browsing. For example, web browser 220 may be used to access information on the World Wide Web, such as web pages, images, videos, and/or other web resources. Web browser 220 may access such web resources using a uniform resource identifier (URI), such as a URL and/or a uniform resource name (URN). Web browser 220 may enable client device 210 to retrieve and present, for display, content of a web page.

Browser extension 230 includes an application, executing on client device 210, capable of extending or enhancing functionality of web browser 220. For example, browser extension 230 may be a plug-in application for web browser 220. Browser extension 230 may be capable of executing one or more scripts (e.g., code, which may be written in a scripting language, such as JavaScript) to perform an operation in association with the web browser 220.

Web server 240 includes a device capable of serving web content (e.g., web documents, hypertext markup language (HTML) documents, web resources, images, style sheets, scripts, and/or text). For example, web server 240 may include a server and/or computing resources of a server, which may be included in a data center and/or a cloud computing environment. Web server 240 may process incoming network requests (e.g., from client device 210) using hypertext transfer protocol (HTTP) and/or another protocol. Web server 240 may store, process, and/or deliver web pages to client device 210. In some implementations, communication between web server 240 and client device 210 may take place using HTTP. Web server 240 may implement a cloud-based service 250. The cloud-based service 250 may provide SaaS services, hosted application services, or the like.

Application server 260 includes a device capable of communicating with client device 210 to support operations of browser extension 230. For example, application server 260 may include a server and/or computing resources of a server, which may be included in a data center and/or a cloud computing environment. Application server 260 may host an application 270 installed on and/or executing on the application server 260. The application 270 may be configured to provide data to the browser extension 230 (e.g., via an API).

Network 280 includes one or more wired and/or wireless networks. For example, network 280 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
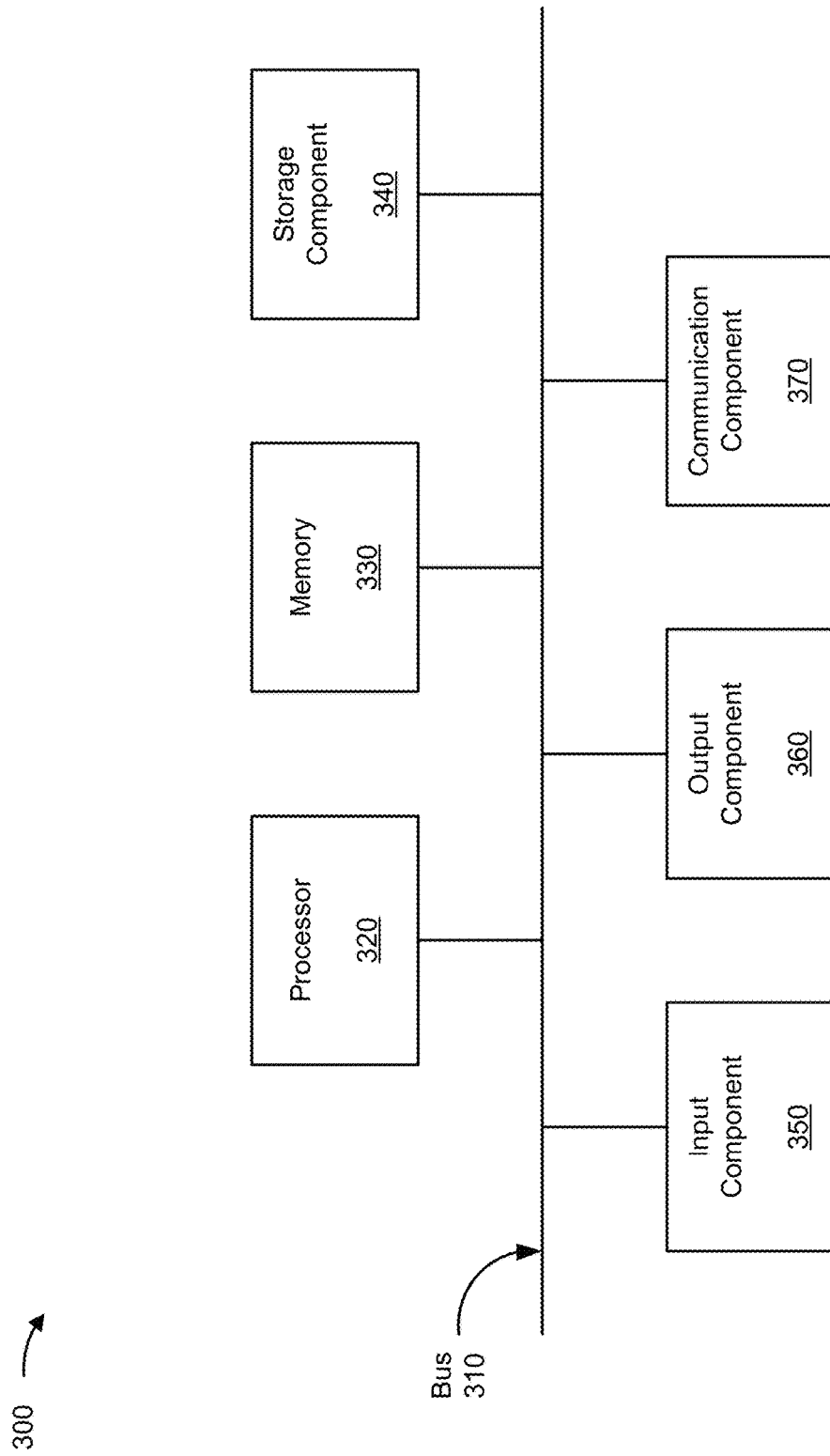
FIG. 3 is a diagram of example components of one or more devices of FIG. 2.

FIG. 3 is a diagram of example components of a device 300, which may correspond to client device 210, web server 240, and/or application server 260. In some implementations, client device 210, web server 240, and/or application server 260 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with exporting data to a cloud-based service. In some implementations, one or more process blocks of FIG. 4 may be performed by a device (e.g., client device 210). In some implementations, one or more process blocks of FIG. 4 may be performed by another device or a group of devices separate from or including the device, such as web server 240 and/or application server 260. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, using a browser extension of a browser application, a request from a user to export the data from an application to a document, of the cloud-based service, that is displayed by the browser application (block 410). As further shown in FIG. 4, process 400 may include obtaining, based on the request and using the browser extension, the data from the application using a private endpoint of the application, wherein the private endpoint of the application is accessible via a private network in which the browser application is implemented and is not accessible via a public network (block 420). As further shown in FIG. 4, process 400 may include obtaining, from the browser application and using the browser extension, a resource identifier of the document that is displayed by the browser application, wherein the resource identifier of the document includes an identifier of the document (block 430). As further shown in FIG. 4, process 400 may include extracting the identifier of the document from the resource identifier of the document (block 440). As further shown in FIG. 4, process 400 may include transmitting, using the browser extension and to the cloud-based service, the data and the identifier to cause the cloud-based service to populate the document with the data (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions for exporting data to a cloud-based service, the set of instructions comprising:
    one or more instructions that, when executed by one or more processors of a device, cause the device to:
        receive, using a browser extension of a browser application, a request from a user to export the data from an application to a document, of the cloud-based service, that is displayed by the browser application,
            wherein the browser application is implemented in an internal network of an organization, and
            wherein the cloud-based service is not associated with the internal network of the organization;
        obtain, based on the request and using the browser extension, the data from the application using a private endpoint of the application,
            wherein the private endpoint of the application is accessible via the internal network of the organization and is not accessible via a public network;
        obtain, from the browser application and using the browser extension, a resource identifier of the document that is displayed by the browser application,
            wherein the resource identifier of the document includes an identifier of the document;
        extract the identifier of the document from the resource identifier of the document; and
        transmit, using the browser extension and to the cloud-based service, a request that indicates an arrangement by which the data is to be populated in the document,
            wherein the request includes the data and the identifier of the document, and
            wherein transmitting the request causes the cloud-based service to populate the document with the data according to the arrangement.

2. The non-transitory computer-readable medium of claim 1, wherein the one or more instructions, when executed by the one or more processors, further cause the device to:
    perform, using the browser extension, a procedure for authenticating the user for requesting data exportation.

3. The non-transitory computer-readable medium of claim 2, wherein the one or more instructions, that cause the device to perform the procedure for authenticating the user, cause the device to:
    obtain, using the browser extension and for the application, an authentication token associated with the user; and
    provide, using the browser extension, the authentication token to the application.

4. The non-transitory computer-readable medium of claim 1, wherein the one or more instructions, when executed by the one or more processors, further cause the device to:
    obtain, from the application using the browser extension, information identifying one or more data sets that the user is authorized to access,
        wherein the data is associated with a data set of the one or more data sets.

5. The non-transitory computer-readable medium of claim 1, wherein the data is obtained from the application using an application programming interface of the application.

6. The non-transitory computer-readable medium of claim 1, wherein the data and the identifier of the document are transmitted to the cloud-based service using an application programming interface of the cloud-based service.

7. The non-transitory computer-readable medium of claim 1, wherein the application is implemented in a first cloud computing environment and the cloud-based service is implemented in a second cloud computing environment.

8. The non-transitory computer-readable medium of claim 1, wherein the arrangement identifies at least one of:
    one or more cells of the document that are to include the data,
        wherein the document is a spreadsheet document,
    one or more slides of the document that are to include the data,
        wherein the document is a presentation document, or
    formatting of the data within the document.

9. A system for exporting data to a cloud-based service, the system comprising:
    one or more memories; and
    one or more processors, communicatively coupled to the one or more memories, configured to:
        obtain, using a browser extension of a browser application, the data from an application using a private endpoint of the application,
            wherein the browser application is implemented in an internal network of an organization,
            wherein the private endpoint of the application is accessible via the internal network of the organization, and
            wherein the cloud-based service is not associated with the internal network of the organization;

determine, using the browser extension, an identifier of a document, of the cloud-based service, to which the data is to be exported; and transmit, using the browser extension and to the cloud-based service, a request that indicates an arrangement by which the data is to be populated in the document,
  wherein the request includes the data and the identifier of the document, and
  wherein transmitting the request causes the cloud-based service to populate the document with the data according to the arrangement.

10. The system of claim 9, wherein the one or more processors are further configured to:
  receive, from a user of the browser application and using the browser extension, a request to export the data to the document,
  wherein the data is obtained based on the request.

11. The system of claim 9, wherein the one or more processors, when determining the identifier of the document, are configured to:
  obtain, using the browser extension, a uniform resource locator (URL) of the document,
    wherein the URL includes the identifier of the document; and
  extract, using the browser extension, the identifier of the document from the URL.

12. The system of claim 9, wherein the data is obtained from the application using a first application programming interface of the application, and
  wherein the data and the identifier of the document are transmitted to the cloud-based service using a second application programming interface of the cloud-based service.

13. The system of claim 9, wherein the application is implemented in a first cloud computing environment and the cloud-based service is implemented in a second cloud computing environment.

14. The system of claim 9, wherein the document is a spreadsheet document.

15. A method of exporting data to a cloud-based service, comprising:
  obtaining, by a device using a browser extension of a browser application, the data from an application using a private endpoint of the application,
  wherein the browser application is implemented in an internal network of an organization,
  wherein the cloud-based service is not associated with the internal network of the organization, and wherein the private endpoint of the application is accessible via the internal network of the organization and is not accessible via a public network;
  obtaining, from the browser application and using the browser extension, a resource identifier of a document that is displayed by the browser application, wherein the resource identifier of the document includes an identifier of the document;
  extracting the identifier of the document from the resource identifier of the document; and
  transmitting, by the device using the browser extension and to the cloud-based service, a request that indicates an arrangement by which the data is to be populated in the document,
  wherein transmitting the request causes the cloud-based service to populate the document with the data according to the arrangement.

16. The method of claim 15, wherein the data is obtained using a first application programming interface of the application, and
  wherein the data is transmitted using a second application programming interface of the cloud-based service.

17. The method of claim 15, wherein the application is implemented in a cloud computing environment.

18. The method of claim 15, wherein the application is implemented on the device.

19. The method of claim 15, wherein the private endpoint is an application programming interface endpoint.

20. The method of claim 15, wherein the internal network of the organization is a local area network, a virtual private network, or a virtual private cloud network.

* * * * *